United States Patent Office 3,755,476
Patented Aug. 28, 1973

3,755,476
DEHYDROHALOGENATION PROCESS
James W. Crary, Wilmington, and Robert Edward Tarney, Hockessin, Del., assignors to E. I. du Pont de Nemours and Company, Wilmington, Del.
No Drawing. Continuation-in-part of application Ser. No. 639,634, May 19, 1967. This application Jan. 14, 1970, Ser. No. 2,977
Int. Cl. C07c 21/20
U.S. Cl. 260—655
8 Claims

ABSTRACT OF THE DISCLOSURE

The halogen containing compound, 3,4-dichloro-1-butene, is treated with a calculated amount of alkali metal hydroxide in the presence of a catalyst in an aqueous medium initially containing 30% to 55% hydroxide and finally containing at least 25% hydroxide by weight based on the water and said hydroxide.

BACKGROUND OF THE INVENTION

This application is a continuation-in-part of our application Ser. No. 639,634 filed May 19, 1967, now abandoned.

It is known to dehydrohalogenate halogen-containing compounds by reaction with aqueous alkali. Chloroprene (2-chloro-1,3-butadiene) has been prepared by dehydrochlorinating 3,4-dichloro-1-butene with aqueous alkaline solution such as aqueous sodium hydroxide or potassium hydroxide. However, these processes are characterized by relatively poor yields of the desired product, relatively high yields of unwanted by-products (1-chloro-1,3-butadiene), and low reaction rates. There has been a need for a more efficient dehydrohalogenation process.

SUMMARY OF THE INVENTION

In accordance with this invention there is provided an improved process for producing chloroprene by reacting 3,4-dichloro-1-butene with an alkali metal hydroxide in an aqueous medium in the presence of an organic catalyst, wherein the improvement consists essentially of providing the aqueous medium with a calculated amount of alkali metal hydroxide sufficient to convert all of the dichlorobutene to chloroprene and thereafter leave the reaction mixture with a final hydroxide concentration of at least about 25% based on the weight of water plus hydroxide, the initial concentration of hydroxide being about 30% to 55% on the same basis. This process produces exceptionally high yields of desired product (2-chloro-1,3-butadiene), relatively free of unwanted organic by-product (1-chloro-1,3-butadiene), and at a relatively fast reaction rate. At the same time by-product alkali metal halide is more easily removed from the reaction product mixture than in prior art processes.

The reaction of this invention is carried out with a substantial excess of alkali metal hydroxide over the molar amount required to convert all of the dichlorobutene to chloroprene. Sufficient alkali metal hydroxide should be present at the start to provide a concentration of at least about 30% by weight, and preferably about 35% to 55% by weight based on the weight of water and hydroxide present. If the concentration of alkali metal hydroxide in the reaction mixture is less than 30% initially, the concentration should be increased to at least that amount shortly thereafter if the advantages of this invention are to be obtained. Similarly if the hydroxide concentration falls below 25% during the reaction, it should be brought back to at least 25% as quickly as possible. In any event, the alkali metal hydroxide concentration during the reaction should always be at least about 20% if the benefits of this invention are to be achieved. During part of the reaction it is desirable to maintain the alkali metal hydroxide concentration between about 35% and 50% by weight.

If no additional alkali metal hydroxide is to be added during the process, the mole ratio of alkali metal hydroxide to dichlorobutane required will generally be inversely proportional to the initial concentration of sodium hydroxide. For example, if the initial concentration of sodium hydroxide is 50 percent, the initial mole ratio of sodium hydroxide to dichlorobutene should be at least about 1.7. If the initial concentration of sodium hydroxide is 35 percent, the minimum initial mole ratio of sodium hydroxide should be at least about 3.

An alternative method of providing the calculated amount of alkali metal hydroxide and maintaining the desired hydroxide concentration would be to add hydroxide incrementally or continuously during the reaction.

According to a preferred procedure of this invention one mole of 3,4-dichloro-1-butene is treated in the presence of a catalyst with aqueous sodium hydroxide solution containing at least 1.7 moles of sodium hydroxide and having a concentration of about 50% by weight based on the water and sodium hydroxide present. Such a reaction can proceed without further addition of sodium hydroxide and the reaction product mixture upon completion of the reaction will contain a minimum of about 25% sodium hydroxide and thus provide the benefits of the process of this invention. High yields of chloroprene at a high reaction rate are produced by this process accompanied by very low yields of the unwanted by-product alpha-chloroprene (1 - chloro-1,3-butadiene). Moreover, removal of by-product sodium chloride is greatly simplified by its low solubility in the highly concentrated sodium hydroxide reaction product mixture.

Conversions of dichlorobutene to chloroprene of 90–100% can be realized in very short reaction times of an hour or less. Preferably, the conversion is at least about 80%. Lower conversions can be used in a continuous process by recycling any unreacted dichlorobutene.

Any alkali metal hydroxide which is useful in dehydrohalogenating halogen compounds in aqueous medium is useful in this invention and the term "hydroxide" as used herein refers to any of these alkali metal hydroxides. Sodium hydroxide is preferred over potassium hydroxide for economy and ready availability.

The concentration of hydroxide, which is sometimes stated herein as simply "percent hydroxide" refers to the percent alkali metal hydroxide by weight based upon the weight of water and alkali metal hydroxide in the reaction mixture. Thus the requirement that the reaction product mixture contain 25% hydroxide means that the reaction product mixture should contain at least 25% alkali metal hydroxide by weight based upon the alkali metal hydroxide and total water present, including water formed by the reaction.

The amount of alkali metal hydroxide to be provided to the aqueous reaction medium is determined by calculation. The calculated amount of alkali metal hydroxide must meet two requirements. It must be in an amount sufficient to (1) convert all the dichlorobutene to chloroprene, and (2) thereafter leave the reaction mixture with the prescribed final hydroxide concentration.

A convenient formula for calculating the minimum amount of alkali metal hydroxide to be provided to the aqueous reaction medium is:

$$X = MW + \frac{B}{3}$$

where X is the minimum weight in grams of alkali metal hydroxide to be provided to the reaction medium per gram mole of dichlorobutene, MW is the gram molecular weight of the alkali metal hydroxide, and B is the weight in grams of the water originally present plus 18. Eighteen in the above computation is the gram molecular weight of water formed for each mole of dichlorobutene reacted.

From the above formula it is apparent that, for each mole of dichlorobutene to be reacted, one mole of alkali metal hydroxide plus an amount of hydroxide equal to B/3 must be provided. If one mole of dichlorobutene is converted to chloroprene, the amount of alkali metal hydroxide remaining is the amount B/3, and the amount of water present is the weight in grams of the water originally present plus 18 grams of water formed in the reaction.

The catalysts useful in this invention can be any of the organic materials which catalyze a dehydrohalogenation reaction in aqueous alkaline media. Typical useful catalysts are quaternary ammonium compounds, polyethylene glycols, quaternary phosphonium compounds, amine oxides, sulfonium compounds, cyclic polyethers, and phosphate esters. Preferred catalysts are quaternary ammonium salts and polyethylene glycols but any of the compounds disclosed in U.S. 2,322,258 and U.S. 3,079,446 can be utilized. Exemplary catalysts are compounds of the structure

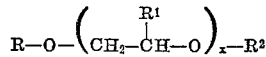

wherein $x$ is at least one, R is H or an organic radical selected from the group consisting of aliphatic, cycloaliphatic, aryl, aralkyl, and alkaryl radicals, $R^1$ is hydrogen or methyl, and $R^2$ is hydrogen or a hydroxyalkyl radical. The upper limit on the number represented by $x$ is not critical. In general, there is little practical reason for using a compound in which $x$ is greater than 30. Examples of the organic radical R are methyl, ethyl, butyl, octadecenyl, benzyl, phenyl, tolyl, xylyl and nonylphenyl. $R^2$ can be 2-hydroxyethyl, 1-methyl-2-hydroxyethyl, etc.

Preferred catalysts are quaternary ammonium compounds of various types. The nitrogen may be substituted by four cyclic or acyclic organic radicals or may be part of a ring. The quaternary compound may contain one or more than one quaternary ammonium group. The aliphatic groups on the nitrogen may be cyclic or acyclic, branched or unbranched, saturated or unsaturated. Aromatic rings may be attached to the nitrogen or the aromatic ring may be a substituent on an aliphatic chain. It is not essential that these radicals be free of non-hydrocarbon substituents. When the quaternary nitrogen function is part of a ring, the ring may be aromatic or non-aromatic. The ring may contain only carbon atoms or may contain other nitrogen atoms, or other members such as oxygen or sulfur atoms. Usually, the rings contain five to seven members. Fused ring systems may be used.

In the quaternary ammonium compounds the anion is not critical. It may be a halogen ion, a hydroxyl ion, an ethyl sulfate ion, or any anion which does not interfere with the reaction. Most often the chloride ion is used because the chlorides are most readily available and least expensive.

The preferred catalysts for use in the present invention are (a) the compounds having the general formula $R_1R_2R_3R_4NCl$ wherein $R_1$, $R_2$ and $R_3$ are aliphatic or araliphatic radicals of up to about 20 carbon atoms and $R_4$ is an aliphatic radical from about 6 to 20 carbon atoms, or an araliphatic radical of 7–20 carbon atoms, or a benzyl radical; and (b) compounds of the above structure in which at least one of $R_1$, $R_2$ and $R_3$ is an aliphatic radical which contains a hydroxy or ether group in a position beta to the nitrogen atom. Typical of the compounds of type (b) are those having the structure

wherein R is an aliphatic or araliphatic hydrocarbon radical of up to about 20 carbon atoms and the sum of $x+y$ ranges from about 2 to 15.

The amount of catalyst used in practicing this invention depends on the effectiveness of the particular catalyst being used. Some of the most effective catalysts can be used in amounts as small as 0.01 percent by weight, based on dichlorobutene. While amounts up to 10 percent or greater can be used, amounts of catalyst no higher than 5 percent are preferred to avoid the expense of recovering and reuse of the catalyst.

In practicing the process of this invention, reaction rate is dependent to a considerable extent on temperature, but temperatures as low as 0° C. can be used. While temperatures as high as 100° C. may also be used, higher temperatures increase the amount of by-products and polymer formation. The preferred temperature range is between about 40° C. and about 70° C.

It is most convenient to use the autogeneous pressures which develop normally under the reaction conditions but higher or lower pressure can be used if desired. Temperatures above about 60° C. can necessitate the use of elevated pressures because of the volatility of the materials in the reaction mixture.

The reaction is carried out in the absence of oxygen to avoid polymerization of reactants or products. Also, it is highly desirable to add polymerization inhibitors such as phenothiazine, alkyl nitrites or nitroso compounds to inhibit polymer formation.

The optimum mole ratio of hydroxide to dichlorobutene varies with the effectiveness of the catalyst utilized, higher ratios being needed with less effective catalysts. The upper limit is not critical but in general there is no advantage in using mole ratios above 20:1.

The process of this invention can be carried out by either a batch or a continuous process. The product formed can be recovered by conventional techniques. For example, the reaction mass can be removed as a liquid, the aqueous and organic phases can be separated by conventional methods, and the chloroprene can be separated from dichlorobutene by distillation. Other methods are within the knowledge of those skilled in the art.

Although the invention is illustrated by the dehydrochlorination of dichlorobutene, it is equally useful for splitting off hydrogen bromide, hydrogen iodide and hydrogen fluoride from the corresponding bromine-, iodine- and fluorine-containing compounds.

As expressed herein, conversions are in terms of mole percent and are based on vapor phase chromatographic analyses in which area percent analyses are converted to mole percent values from predetermined calibrations. The general formula used in terms of the reaction mixture analyzed is $$\frac{\text{Moles of chloroprene} \times 100}{\text{Moles of chloroprene} + \text{moles of unreacted dichlorobutene}}$$

The weight percent of catalyst is based on the weight of dichlorobutene. The percent of α-chloroprene is based on the weight of 2-chloro-1,3-butadiene.

The following examples will better illustrate the nature of the present invention. All parts, percentages, and proportions are by weight unless otherwise indicated.

EXAMPLES 1–26

A series of experiments is carried out using the following procedure and the conditions in Table I.

The reactor is a flask fitted with an agitator, reflux condenser and nitrogen inlet tube. Air is flushed from the flask with nitrogen. Sodium hydroxide solution is put into the flask, and the flask is heated to the specified reaction temperature. Stirring is stopped, the 3,4-dichlorobutene containing a small amount of phenothiazine (0.02–0.1% based on the 3,4-dichlorobutene) and also containing the catalyst is added to the flask through the top of the reflux condenser. Stirring is then resumed and the same reaction temperature is maintained for the specified reaction time. (Timing of the reaction is measured from the resumption of the stirring.) At the end of the specified reaction time, stirring is stopped, the flask is removed from the bath and the reaction mixture is diluted with cold water. The reaction mixture is extracted with a volume of toluene twice that of the dichlorobutene originally used, and the organic layer is separated and analyzed by vapor phase chromatography. Area percent analyses are converted to mole percent values from predetermined calibrations.

nitrogen atmosphere is maintained throughout the reaction. The sodium hydroxide and catalyst are placed in the flask. With slow agitation, the contents of the flask are heated to 65° C. Agitation is increased to 1300 r.p.m. and from a dropping funnel 50 g. of 3,4-dichloro-1-butene containing 0.02 percent by weight of phenothiazine is introduced into the flask. The reaction is allowed to proceed at 65° C. for 15 minutes. The flask is then cooled quickly to 0° C. Cold toluene is added, the aqueous and organic phases are separated, and the aqueous phase is extracted three times with toluene. The toluene extracts are combined and analyzed by vapor phase chromatography as in Example 1. Table II shows the conversions obtained.

TABLE I

| Run | Catalyst | Catalyst percent | Initial NaOH concentration, percent | Initial mole ratio NaOH/DCB | Temp. (° C.) | Reaction time, (min.) | Calculated final NaOH concentration, percent [1] | DCB conversion, percent | α-Chloroprene, percent |
|---|---|---|---|---|---|---|---|---|---|
| 1 [2] | Polyethylene glycol, m.w. 200 ("Carbowax" 200, Union Carbide Corp.) | 1 | 50 | 1 | 60 | 45 | 0 | 50.9 | 0.24 |
| 2 | do | 1 | 50 | 1.7 | 60 | 45 | 25 | 88.1 | 0.20 |
| 3 | do | 1 | 50 | 2.1 | 60 | 45 | 30 | 98.3 | 0.22 |
| 4 | do | 1 | 35 | 5.9 | 60 | 45 | 30 | 97.1 | 0.19 |
| 5 [2] | do | 0.87 | 20 | 9.8 | 60 | 30 | 18 | 26.1 | 1.23 |
| 6 | do | 0.87 | 40 | 9.7 | 60 | 30 | 37 | 100 | 0.22 |
| 7 | do | 4.2 | 30 | 9.3 | 60 | 30 | 27 | 94.9 | 0.20 |
| 8 | Pentaethylene glycol | 0.043 | 50 | 9.8 | 60 | 20 | 46 | 99.9 | 0.33 |
| 9 [2] | do | 8.7 | 25 | 10 | 50 | 20 | 23 | 55 | 0.46 |
| 10 | Triethylene glycol | 1.7 | 50 | 8.3 | 50 | 2 | 45 | 95 | 0.38 |
| 11 | Dipropylene glycol | 8.7 | 50 | 8.3 | 50 | 20 | 45 | 99.6 | 0.51 |
| 12 [2] | do | 8.7 | 25 | 10 | 50 | 20 | 23 | 11 | 1.37 |
| 13 | Polypropylene glycol, m.w. 250 | 1.7 | 50 | 8.3 | 50 | 2 | 45 | 91 | 0.35 |
| 14 [2] | do | 8.7 | 25 | 10 | 50 | 20 | 23 | 39 | 0.46 |
| 15 | }Triethylene glycol, monomethyl ether{ | 0.9 | 50 | 4.1 | 50 | 20 | 41 | 98 | 0.35 |
| 16 [2] | | 8.7 | 25 | 10 | 50 | 20 | 23 | 27 | 0.61 |
| 17 | }Diethylene glycol, monobutyl ether{ | 4.3 | 50 | 8.3 | 50 | 20 | 45 | 99.6 | 0.42 |
| 18 [2] | | 8.7 | 25 | 10 | 50 | 20 | 23 | 15 | 1.03 |
| 19 | Octadecyldimethylamine oxide | 1.8 | 50 | 10 | 60 | 15 | 46 | 94 | 0.13 |
| 20 | Pentaethylene glycol | 1.7 | 50 | 8.3 | 0 | 5 | 45 | 99.8 | 0.27 |
| 21 | do | 1.7 | 50 | 8.3 | 25 | 2 | 45 | 99.8 | 0.40 |
| 22 | 2,3-butanediol | 8.7 | 50 | 10 | 60 | 15 | 46 | 94 | 0.43 |
| 23 | 2-ethoxyethanol | 6.4 | 50 | 10 | 60 | 30 | 46 | 99.8 | 0.38 |
| 24 | 2-methoxyethanol | 4.3 | 50 | 10 | 60 | 15 | 46 | 99.9 | 0.29 |
| 25 | 1-methoxy-2-propanol | 8.7 | 50 | 10 | 60 | 15 | 46 | 99.9 | 0.25 |
| 26 | Diethylene glycol, ethyl ether | 8.7 | 50 | 4.1 | 50 | 20 | 41 | 99.9 | 0.39 |

[1] Assuming 100% conversion of DCB.
[2] Comparative data inserted to show improvement using this invention.

In Table I the concentration of sodium hydroxide is based on weight of sodium hydroxide plus weight of water. Percentage of catalyst is based on weight of 3,4-dichlorobutene (DCB).

EXAMPLES 29–33

Another series of experiments was conducted using the same general procedure as in Examples 1–26. The sodium hydroxide used was saturated with sodium chloride. A

TABLE II

| Run | Catalyst | Catalyst percent | Initial NaOH concentration, percent | Initial mole ratio NaOH/DCB | Temp. (° C.) | Reaction time, (min.) | Calculated final NaOH concentration, percent [1] | DCB conversion, percent | α-Chloroprene, percent |
|---|---|---|---|---|---|---|---|---|---|
| 27 | Octyltrimethylammonium chloride | 1 | 50 | 2 | 65 | 15 | 29 | 89.1 | 0.26 |
| 28 | Octadecyltrimethylammonium chloride | 1 | 50 | 2 | 65 | 15 | 29 | 99.4 | 0.24 |

[1] Assuming 100% conversion of DCB.

EXAMPLES 27–28

Another series of experiments was conducted using the following procedure and the conditions in Table II.

A jacketed 4-neck 500-ml. round-bottomed flask equipped with agitator, thermometer, reflux condenser and nitrogen inlet tube is flushed with nitrogen and a sample of the organic phase of the reaction mass was taken using a syringe, washed with water, and analyzed by vapor phase chromatography. Table III shows the type and amount of catalyst used, the concentrations and molar proportions of sodium hydroxide, the reaction time and temperature, and the results obtained.

TABLE III

| Run | Catalyst | Catalyst percent | Initial NaOH concentration, percent | Initial mole ratio NaOH/DCB | Calculated final NaOH concentration, percent [1] | Temp. (° C.) | Reaction time (min.) | DCB conversion, percent | α-Chloroprene, percent |
|---|---|---|---|---|---|---|---|---|---|
| 29 | $C_9H_{19}-C_6H_4-O(CH_2CH_2O)_{15}H$ ("Igepal" CO-730 from General Aniline & Film Corp.) | 2.5 | 50 | 10 | 46 | 60 | 30 | 99.1 | 0.47 |
| 30 | $Octadecyl-N(O)(CH_2CH_2OH)_2$ | 0.5 | 50 | 10 | 46 | 60 | 30 | 100 | 0.25 |
| 31 | Dodecyl(2-hydroxyethyl)-methylsulfonium iodide | 10 | 50 | 10 | 46 | 0 | 30 | 98.4 | |
| 32 | Dodecylethylmethylsulfonium chloride | 1 | 50 | 10 | 46 | 25 | 30 | 99.2 | 0.11 |
| 33 | $(C_2H_5O)_2PO-CH_2N^+(CH_2CH_2OH)_3$ $-(CH_2-C_6H_4-C_{12}H_{25})Cl^-$ | 1 | 50 | 10 | 46 | 60 | 30 | 100 | 0.15 |

[1] Assuming 100% conversion DCB.

EXAMPLES 34–35

The reactor is a flask fitted with an agitator, reflux condenser, and an adaptor fitted with a serum cap for withdrawing samples. Air is flushed from the flask with nitrogen, and an atmosphere of nitrogen is maintained in the reactor. The temperature is controlled by a steam bath. The sodium hydroxide is introduced into the flask and brought to reaction temperature. 3,4-dichloro-1-butene containing about 0.005% phenothiazine and the catalyst is then introduced into the flask through a stoppered glass joint. At the end of the desired reaction time, agitation and temperature control are discontinued. Samples of the organic phase are withdrawn, washed with water, and analyzed by vapor phase chromatography. Area percent analyses are converted to mole percent values from predetermined calibrations.

The 3,4-dichloro-1-butene used is 97–98 percent pure. Molar amounts are not corrected for impurities. The concentration of sodium hydroxide is based on weight of sodium hydroxide plus the weight of water. The concentration given in Table IV is the concentration of the sodium hydroxide solution initially charged to the reactor.

2. The process of claim 1 in which the alkali metal hydroxide is sodium hydroxide.

3. The process of claim 1 in which the concentration of alkali metal hydroxide is maintained between about 35% and 50% by weight during part of the reaction.

4. The process of claim 3 in which the alkali metal hydroxide is sodium hydroxide.

5. The process of claim 4 in which the catalyst is a polyethylene glycol of the formula

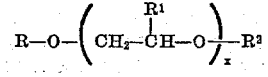

where $x$ is at least one, R is H or an organic radical selected from the group consisting of aliphatic, cycloaliphatic, aryl, aralkyl, and alkaryl, $R^1$ is hydrogen or methyl, and $R^2$ is hydrogen or a hydroxy alkyl radical.

6. The process of claim 1 in which the initial concentration of alkali metal hydroxide is 35% to 55% by weight based on the water and hydroxide.

7. The process of claim 1 in which the alkali metal hydroxide concentration during the reaction is always at least about 20%.

TABLE IV

| Run | Catalyst | Catalyst percent | Initial NaOH concentration, percent | Initial mole ratio NaOH/DCB | Calculated final NaOH concentration, percent [1] | Temp. (°C.) | Reaction time (min.) | DCB conversion, percent | α-Chloroprene, percent |
|---|---|---|---|---|---|---|---|---|---|
| 34 | Tetrabutylphosphonium chloride | 5 | 50 | 10 | 46 | 60 | 10 | 100 | 0.68 |
| 35 | Methyltrioctylphosphonium dimethylphosphate | 5 | 50 | 10 | 46 | 60 | 10 | 100 | 0.50 |

[1] Assuming 100% conversion DCB.

What is claimed is:

1. In the process for producing chloroprene by reacting 3,4-dichloro-1-butene with an alkali metal hydroxide in an aqueous medium in the presence of an organic catalyst, the improvement consisting essentially of providing the aqueous medium with a calculated amount of alkali metal hydroxide sufficient to convert all of said dichlorobutene to chloroprene and thereafter leave the reaction mixture with a final hydroxide concentration of at least about 25% based on weight of water plus hydroxide, the initial concentration of hydroxide being about 30% to 55% on the same basis.

8. The process of claim 1 in which the conversion of dichlorobutene to chloroprene is at least about 80%.

References Cited

UNITED STATES PATENTS

| 3,079,446 | 2/1963 | MacFarlane | 260—655 |
| 2,430,016 | 11/1947 | Hearne et al. | 260—655 |

BERNARD HELFIN, Primary Examiner

A. SIEGEL, Assistant Examiner